United States Patent Office.

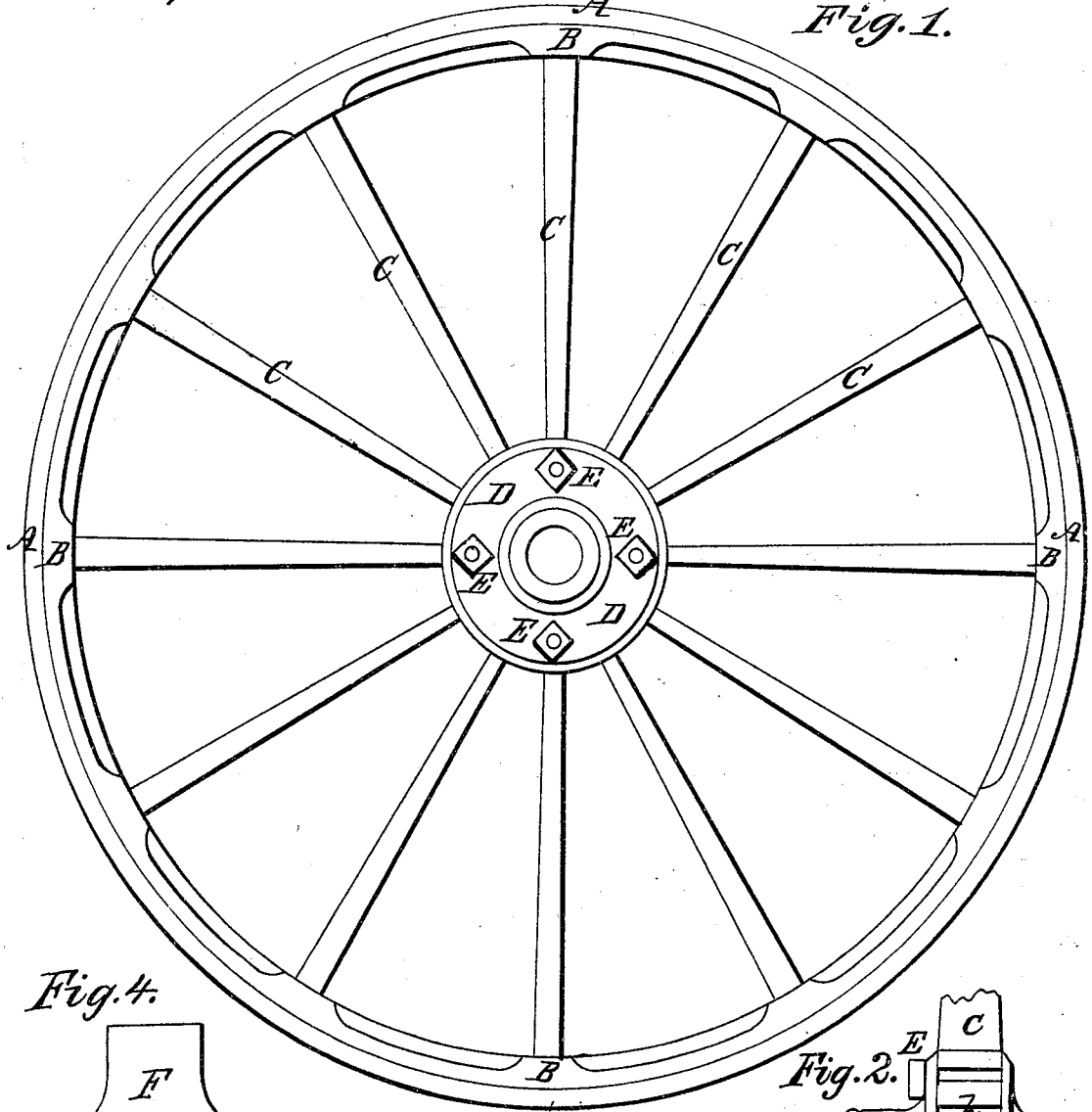

PARIS RICHARDSON, JR., OF WARREN COUNTY, ILLINOIS.

Letters Patent No. 76,524, dated April 7, 1868.

IMPROVEMENT IN WAGON-WHEEL.

*The Schedule referred to in these Letters Patent and making part of the same.*

TO ALL WHOM IT MAY CONCERN:

Be it known that I, PARIS RICHARDSON, Jr., of Warren county, in the State of Illinois, have invented a new and improved Wagon and Carriage-Hub; and I do hereby declare that the following is a full and exact description thereof, reference being had to the accompanying drawings, and letters of reference marked thereon, making a part of this specification, in which—

Figure 1 is a view of the wheel complete.

Figure 2, a view of the hub, and

Figures 3 and 4 views of sections of the hub.

Like letters indicate like parts.

Letter A represents the tire.

Letter B represents the felloe.

Letter C represents the spokes.

Letter D represents the inner part (or cap) of the hub.

Letter e represents the bolts holding the hub together.

Letter F represents the outside portion of the hub.

Letter h is the grooves or mortises for the spokes.

Letter G is the wedge-spindle of the hub.

The nature of my invention consists in preparing a felloe of metal, which is cast complete, and without joints, with mortises to admit the spokes, full size, without tenons, and in providing a hub in two sections, in one of which (fig. 4) the grooves or mortises are cut for the spokes, and which extend from the mortises, tapering to the end, as shown by G at fig. 4, making a wedge, by means of which the spokes are tightened, and firmly fastened by fastening the other section of the hub D thereto.

To enable others to make use of my invention, I will proceed to describe its construction, and the manner of attaching the several parts.

I first construct the felloe, of metal, without joint, and with the mortises ready for the spokes. I next place the tire upon the felloe, and then prepare the spokes, and drive them into the mortises of the felloe, without tenon, thereby increasing the strength of that portion of the wheel. I then cut off the hub-ends of the spokes, so as to leave just sufficient room to insert the smallest portion of the spindle G.

I construct the hub in two sections, in one of which (fig. 4) I cut the grooves for the spokes, and from the outside of the grooves to the end of the hub I cut it tapering, as at G. I then make the other portion of the hub, which is a cap, D, which fits over the wedge or spindle G, and when pressed down until it rests upon the rim in which the grooves h h are cut, completes the hub.

To fasten the spokes into the hub, I then insert the spindle G between the ends of the spokes, (the ends of the spokes surrounding the spindle;) then place the cap, D, upon the ends of the spokes, and on the spindle; then, by means of a screw passed through the hub, I draw the cap, D, down the spindle, forcing the spokes up the inclined plane, and into the grooves h h h. I then fasten the two parts of the hub, F and D, together, by means of bolts and screws, as shown at e e e e, fig. 1, and the wheel is complete. Thus, with a wheel constructed, if a spoke becomes defective, the cap, D, may be taken off, and the spoke taken out, without disturbing any other portion of the wheel.

What I claim as my invention, and desire to secure by Letters Patent, is—

A wagon-wheel, having a felloe, B, cast of one piece of metal, and a hub, composed of the metal part, F, and cap, D, with grooves h, and wedge-spindle G, all connected and arranged, substantially as and for the purposes set forth.

PARIS RICHARDSON, JR.

Witnesses:
O. F. PRICE,
HENRY D. NELSON.